US010747534B1

(12) United States Patent
Preusser et al.

(10) Patent No.: US 10,747,534 B1
(45) Date of Patent: Aug. 18, 2020

(54) VECTORIZATION OF WIDE INTEGER DATA PATHS INTO PARALLEL OPERATIONS WITH VALUE EXTRACTION FOR MAINTAINING VALID GUARD BANDS

(71) Applicant: Xilinx, Inc., San Jose, CA (US)

(72) Inventors: Thomas B. Preusser, Dresden (DE); Thomas A. Branca, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 78 days.

(21) Appl. No.: 16/200,336

(22) Filed: Nov. 26, 2018

(51) Int. Cl.
*G06F 7/499* (2006.01)
*G06F 9/30* (2018.01)

(52) U.S. Cl.
CPC ........ *G06F 9/30036* (2013.01); *G06F 7/4991* (2013.01); *G06F 9/30014* (2013.01)

(58) Field of Classification Search
CPC ...... G06F 7/4991; G06F 7/57; G06F 9/20014; G06F 9/30036
See application file for complete search history.

(56) References Cited

U.S. PATENT DOCUMENTS 5,432,728 A * 7/1995 Curtet ..................... G06F 7/508 708/710
5,636,351 A * 6/1997 Lee ......................... G06F 7/483 708/209
7,680,874 B2 * 3/2010 Takegama ............... G06F 7/506 708/518

OTHER PUBLICATIONS

Fu, Yao et al., "Deep Learning with INT8 Optimization on Xilinx Devices," WP486 (v1.0.1), Apr. 24, 2017, pp. 1-11, Xilinx, Inc., San Jose, California, USA.

Vestias, Mario et al., "Parallel Dot Products for Deep Learning on FPGA," Proc. of the 27th International Conference on Field Programmable Logic and Applications (FPL 2017), Sep. 4, 2017, pp. 1-4, IEEE, Piscataway, New Jersey, USA.

Specification and drawings for U.S. Appl. No. 16/200,313, filed Nov. 26, 2018, Preusser et al.

* cited by examiner

*Primary Examiner* — Chuong D Ngo

(74) *Attorney, Agent, or Firm* — Patterson + Sheridan, LLP

(57) ABSTRACT

The embodiments herein describe techniques for monitoring guard bits in multi-result vectors generated by a first arithmetic unit in a chain and using side band logic to add or subtract offset values from guard bits in a second, subsequent arithmetic unit in the chain. In this manner, the guard bits can be adjusted on the fly (e.g., without interrupting or terminating the chain) to ensure the guard bits do not overflow. The side band logic can maintain a guard bits overflow value which is then combined with the output vector from the final arithmetic unit in the chain to compensate for adjusting the guard bits at the various arithmetic units in the chain. In this manner, the chain can have any desired length.

20 Claims, 8 Drawing Sheets

CHART 400

| GUARD BIT VALUE | OFFSET VALUE | RANGE OF NEW GUARD BIT VALUE |
|---|---|---|
| 0 | +2 | 1:3 |
| 1 | +2 | 2:4 |
| 2 | +2 | 3:5 |
| 3 | +2 | 4:6 |
| 4 | +2 | 5:7 |
| 5 | +2 | 6:8 |
| 6 | +2 | 7:9 |
| 7 | +2 | 8:10 |
| 8 | -2 | 5:7 |
| 9 | -2 | 6:8 |
| 10 | -2 | 7:9 |
| 11 | -2 | 8:10 |
| 12 | -2 | 9:11 |
| 13 | -2 | 10:12 |
| 14 | -2 | 11:13 |
| 15 | -2 | 12:14 |

FIG. 4

CHART 700

| GUARD BIT VALUE | OFFSET VALUE | RANGE OF NEW GUARD BIT VALUE |
|---|---|---|
| 0 | 0 | 0:1 |
| 1 | 0 | 1:2 |
| 2 | -1 | 1:2 |
| 3 | -1 | 2:3 |

FIG. 7

VECTORIZATION OF WIDE INTEGER DATA PATHS INTO PARALLEL OPERATIONS WITH VALUE EXTRACTION FOR MAINTAINING VALID GUARD BANDS

TECHNICAL FIELD

Examples of the present disclosure generally relate to performing multiple reduced precision arithmetic operations in parallel using more precise arithmetic units.

BACKGROUND

Programmable integrated circuits (e.g., programmable logic devices, field programmable gate arrays (FPGAs), etc.) and non-programmable integrated circuits can include arithmetic units (e.g., multipliers, adders, digital signal processors, accumulators, and the like) which are designed to receive multiple input operands and generate a resulting value—e.g., performing an add, subtract, multiple, or multiply accumulator (MAC) operation. The arithmetic units generate an output with a fixed number of bits (e.g., a 48 bit output) which defines the precision of the unit. However, rather than performing a single operation, the arithmetic units can be used to perform multiple reduced precision arithmetic operations in parallel. For example, rather than performing a single operation using 16 bit operands, the unit can perform two operations using 8 bit operands. However, the results of the two 8-bit operations are still stored within the same 48 bit output vector of the arithmetic unit. For example, a first sub-portion of the output vector is allotted to the first 8-bit operation while a second sub-portion of the output vector is allotted to the second 8-bit operation. However, in a chain of arithmetic units where the results of one arithmetic unit is used as an input to the next unit in the chain, the results may begin to overflow. For example, the first sub-portion of the output vectors may not be sufficient to store the results of the operation, in which case, the most significant bits of the first operation may interfere with the least significant bits of the second operation in the output vector.

To prevent this overflow, guard bits can be allocated in the output vector which provides a buffer between the portions of the vector assigned to the two operations. When in the chain the results of the first operation would overflow, this is absorbed by the guard bits. As a result, the guard bits provide a limited buffer which permits the first operation to grow without affecting the bits in the output vector assigned to the second operation.

SUMMARY

Techniques for performing reduced precision operations in parallel are described. One example is an integrated circuit that includes a chain of arithmetic units where each arithmetic unit is configured to selectively perform either a single large operation or multiple reduced-precision operations in parallel, where the arithmetic units are configured to, when performing the multiple reduced-precision operations in parallel, generate multi-result vectors comprising guard bits. The integrated circuit also includes side-band logic comprising a plurality of guard monitors where each of the plurality of guard monitors is configured to receive the guard bits from one of the arithmetic units, generate an offset value based on determining whether the guard bits satisfy a predefined value, transmit the offset value to a subsequent arithmetic unit in the chain, and update a guard bits overflow value to compensate for changing the guard bits in a multi-result vector in the subsequent arithmetic unit using the offset value. The integrated circuit also includes a guard corrector configured to generate multiple reduced-precision results based on receiving a multi-result vector from a last arithmetic unit in the chain and a guard bits overflow value from a last guard monitor of the plurality of guard monitors.

One example described herein is a circuit that includes a chain of arithmetic units, where each arithmetic unit is configured to perform multiple reduced-precision operations in parallel, where the arithmetic units are configured to, when performing the multiple reduced-precision operations in parallel, generate multi-result vectors comprising guard bits. The circuit includes side-band logic configured to receive first guard bits from a first one of the arithmetic units, generate an offset value based on determining whether the first guard bits satisfy a predefined value, transmit the offset value to a subsequent arithmetic unit in the chain, and update a first guard bits overflow value to compensate for changing second guard bits in a multi-result vector in the subsequent arithmetic unit using the offset value. The circuit also includes a guard corrector configured to generate multiple reduced-precision results based on receiving a multi-result vector from a last arithmetic unit in the chain and a second guard bits overflow value based on the first guard bits overflow value.

One example described herein is a method that includes performing multiple reduced-precision operations in parallel using a first arithmetic unit in a chain of arithmetic units to generate a multi-result vector comprising guard bits, where the arithmetic units are capable of performing both the multiple reduced-precision operations and a single large operation, receiving the guard bits from the first arithmetic unit, generating an offset value based on determining whether the guard bits satisfy a predefined value, transmitting the offset value to a subsequent arithmetic unit in the chain, and updating a guard bits overflow value to compensate for changing the guard bits in a multi-result vector in the subsequent arithmetic unit using the offset value.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 is a chart illustrating monitoring the guard bits to prevent an overflow, according to an example.

FIG. 7 is a chart illustrating monitoring the guard bits to prevent an overflow, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
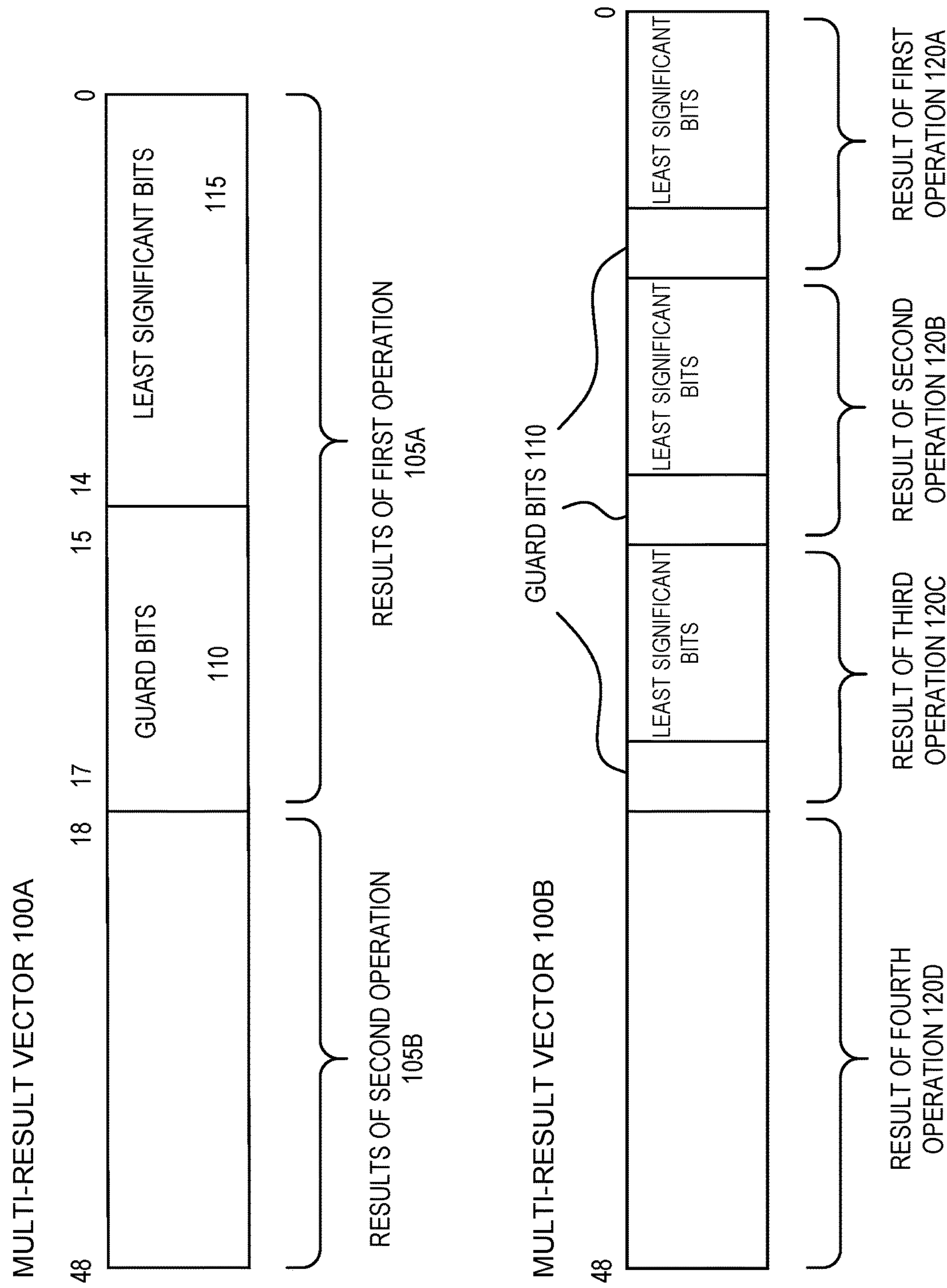
FIG. 1 illustrates multi-result vectors for storing results of performing parallel reduced-precision arithmetic operations, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein describe monitoring guard bits in a multi-result vector to prevent the guard bits from overflowing. As mentioned above, guard bits can be disposed between different sub-portions in an output vector which are used to store results from performing multiple reduced-precision operations. However, the guard bits are limited and can only absorb so much overflow information until they themselves overflow into the next sub-portion in the vector. Thus, the number of guard bits can limit the size of the chain of arithmetic units. For example, if the vector includes three guard bits, the chain may be limited to only seven arithmetic units since anymore can mean the guard bits could overflow (depending on the value of the operands). When the chain ends, the guard bits are then reset before the vector can then be inputted into another chain of eight arithmetic units. Resetting the guard bits using external logic can take several clock cycles and slow down the overall computation.

Many different types of compute operations can require large chains of arithmetic units. For example, different types of neural networks or machine learning models can use a chain that includes hundreds, or thousands, of arithmetic units. In some situations, the neural network can perform reduced-precision operations using the more precise arithmetic units (e.g., perform four 4-bit operations rather than one 16-bit operation at each unit). However, the size of the guard bits limits the size of the chain of the arithmetic units. For example, if the neural network has a chain of a thousand units, the chain may be sub-divided into multiple smaller chains (whose lengths are determined by the number of guard bits). Doing so can slow down the execution of the neural network since the guard bits are reset after reaching the end of the smaller chains. While the number of guard bits can be increased (in order to increase the length of the chains), this reduces the parallelism on the given wide data path. As more bits are used for padding, fewer are available for operands which reduces the number of parallel lanes and impacts the operational density achieved for an arithmetic unit.

The embodiments herein describe techniques for monitoring the guard bits in a first stage using side band logic and then adding or subtracting offset values from guard bits in a second, subsequent stage in the chain. In this manner, the guard bits can be adjusted on the fly (e.g., without interrupting or terminating the chain) to ensure the guard bits do not overflow. The side band logic can maintain a guard bits overflow value which is then combined with the output vector from the final arithmetic unit in the chain to compensate for adjusting the guard bits at the various arithmetic units in the chain. In this manner, the chain can have any desired length. Moreover, the chain is not slowed down by monitoring the guard bits in the side band logic. Put differently, in one embodiment, the side band logic can monitor and adjust the guard bits without having to stop, pause, or terminate the chain of arithmetic units.

FIG. 1 illustrates multi-result vectors 100 for storing results of performing parallel reduced-precision arithmetic operations, according to an example. The multi-result vectors 100 illustrate the output vector of an arithmetic unit. In this example, the multi-result vector 100A includes 48 bits which are sub-divided to store the results of a first reduced-precision operation 105A and a second reduced-precision operation 1056. For example, the arithmetic unit may be architected (or designed) to perform a more precise operation which is stored in the 48 bits of the vector 100A. However, the architecture of the arithmetic unit is also able to perform, in parallel, a first reduced-precision operation (the results of which are stored in the bits assigned for the first operation 105A) and a second reduced precision operation (the results of which are stored in the second operation 105B).

In FIG. 1, the 48 bits are divided or assigned such that bits 0-14 are allocated for storing the least significant bits 115 of the results of the first operation 105A. For some operations, bits 0-14 may be sufficient to accurately store the results of the first operation. That is, the results of performing the first operation can be sufficiently (and precisely) stored in the least significant bits 115. However, as vector 100A is passed to a downstream unit in a chain of arithmetic units, the value may begin to grow (either negatively or positively) so that the least significant bits 115 are not sufficient. In such a case, the guard bits 110 can absorb the overflow and thereby maintain the precision of performing the first operation. For example, the guard bits 110 can store a signed bit and/or the most significant bits of the results of performing the first operation 105A.

As mentioned above, the number of guard bits 110 can impact the size of the chain of arithmetic units. In one embodiment, the number of reduced-precision arithmetic operations that can be performed is limited to 2^N−1 where N is the number of guard bits 110. However, as described in detail below, the embodiments herein describe techniques for monitoring the guard bits 110 and adjusting these bits to ensure they do not overflow (or overwrite) the bits in the vector 100A that store the result of the second operation 1056.

The bit assignment illustrated in the multi-result vector 100A is just one example of sub-dividing the vector 100A. In other examples, it may be desirable to increase or decrease the number of bits assigned to the results of the first operation 105A, the guard bits 110, and the results of the second operation 1056. Further, the vector 100A may have a different number of total bits depending on the architecture of the arithmetic unit—e.g., 32, 64, etc.

While the multi-result vector 100A illustrates performing two parallel reduced-precision operations, the vector 100B illustrates performing four parallel reduced-precision operations. As shown, the vector 100B is subdivided to store the results of performing a first operation 120A, a second operation 120B, a third operation 120C, and a fourth operation 120D. Moreover, guard bits 110 provide a buffer for absorbing overflow data between the results of the first operation 120A and the results of the second operation 1206, between the results of the second operation 1206 and the results of the third operation 120C, and between the results of the third operation 120C and the results of the fourth operation 120D. For example, the operations 120A-120D may store the results of performing four 4-bit operations.

The techniques herein can monitor the guard bits 110 in the vector 1006 and perform individual adjustments to these bits to ensure they do not overflow into bits that are assigned to a different reduced-precision operation.

Figure 2:
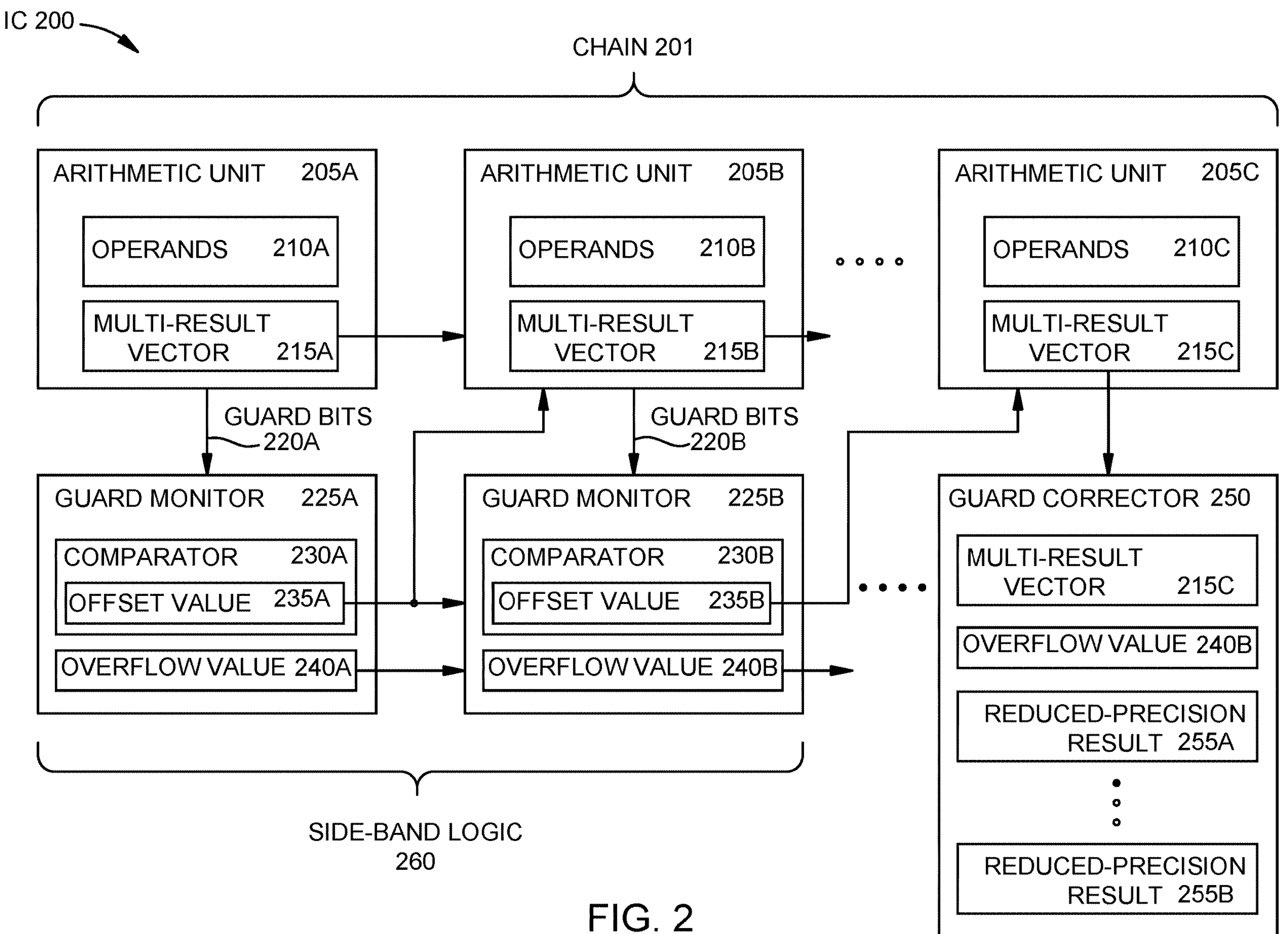
FIG. 2 is an integrated circuit that includes a chain of arithmetic units that performs parallel reduced-precision arithmetic operations, according to an example.

FIG. 2 is an integrated circuit (IC) 200 that includes a chain 201 of arithmetic units 205 which performs parallel reduced-precision arithmetic operations, according to an example. The arithmetic units 205 may perform different operations. For example, the units 205 may be multipliers, adders, subtractors, accumulators, and the like. In one embodiment, the arithmetic units 205 are digital signal processors (DSP) which perform a MAC operation. In one embodiment, the chain 201 of arithmetic units 205 forms part of a neural network or a machine learning model. The arithmetic units 205 may perform convolution or another operation as defined in the neural network.

Each arithmetic units 205 receives operands 210 which are then processed (e.g., added, subtracted, multiplied, etc.) to generate a multi-result vector 215. For example, if the arithmetic units 205 perform two reduced-precision operations using the operands 210, the multi-result vector 215 may be formatted similar to the vector 100A illustrated in FIG. 1. However, if the arithmetic units 205 perform four reduced-precision operations using the operands 210, the multi-result vector 215 may be formatted similar to the vector 1006.

In one example, assuming the arithmetic unit 205A is the first unit in the chain 201, the unit 205A may perform multiple reduced-precision MAC operations in parallel using the operands 210A which are then stored in the multi-result vector 215A. As shown, this vector 215A is then passed to the arithmetic unit 205B. In turn, the unit 205B uses its operands 210B to perform multiple reduced-precision MAC operations in parallel which are then combined with the multi-result vector 215A received from the unit 205A to generate a multi-result vector 2158 for the arithmetic unit 205B.

The arithmetic unit 205 then transmits the multi-result vector 215B down the chain 201. Eventually, the last unit in the chain 201 is reached (e.g., the arithmetic unit 205C) where it uses the vector from the previous unit and its operands 210C to generate the multi-result vector 215C.

To prevent the guard bits in the vectors 215 from overflowing, the IC 200 includes guard monitors 225 for monitoring and adjusting the guard bits in the vectors 215. In this example, each arithmetic unit 205 has its own guard monitor 225, except for the last arithmetic unit 205C in the chain 201. However, this is not a requirement. In other examples, there may be fewer guard monitors 225 than arithmetic units 205. For example, there may be a guard monitor 225 for every other arithmetic unit 205.

As shown, the arithmetic units 205 transmit the guard bits 220 in each of the multi-result vectors 215 to the guard monitors 225. The guard monitors 225 include a comparator 230 which receives the guard bits 220 and determines an offset value 235 for adjusting the guard bits in a subsequent arithmetic unit 205 in the chain 201. For example, the comparator 230A in the guard monitor 225A evaluates the guard bits 220A received from the arithmetic unit 205A and then generates the offset value 235A. The guard monitor 225A forwards the offset value 235A to the next arithmetic unit 205B which can adjust the guard bits in the multi-result vector 215B. The various techniques for generating the offset value 235 are described in more detail below.

In addition to generating the offset values 235 using the comparators 230, the guard monitors 225 also maintain a guard bits overflow value 240 (referred to simply as the "overflow value 240") which stores the adjustments that have been made by the current guard monitor 225, as well as the previous guard monitors 225, to the guard bits. That is, each time a comparator 230 generates an offset value 235 which adjusts the guard bits, one of the guard monitor 225 stores an indication of this change in the overflow value 240 which is then passed to the subsequent guard monitor 225 in the chain 201. For example, the guard monitor 225B can adjust the overflow value 240B using the offset value 235A received from the previous guard monitor 225A. That is, the guard monitor 225B adjusts the received overflow value 240A using the received offset value 235A to generate its own overflow value 240B. As such, the overflow value 240B can be used later to compensate for changing the guard bits in the arithmetic unit 205B using the offset value 235A. In this manner, the overflow value 240 is updated by the guard monitors 225 as the multi-result vector 215 propagates through the chain 201. Moreover, because each guard monitor 225 includes a memory element for storing the overflow value 240, the chain 201 can be pipelined so that each guard monitor 225 stores a different overflow value 240. The arithmetic units 205 also include a memory element for storing the multi-result vector 215 so that the units 205 can store different vectors 215.

The IC 200 includes a guard corrector 250 which stores the "total" or final multi-result vector 215C generated by the last arithmetic unit 205C in the chain 201 as well as the final overflow value 240B (also referred to as a final guard bits overflow value) received from the last guard monitor 225B in the chain 201. As described in more detail below, the guard corrector 250 can use the data in the multi-result vector 215C and the overflow value 240B to generate multiple reduced-precision results 255. For example, if the arithmetic units 205 are each designed to perform a 16 bit MAC operation but instead perform two parallel 5 bit MAC operations, the guard corrector 250 can generate two reduced-precision results 255—one for each of the 5 bit operations. If the arithmetic units 205 are designed to perform a 16 bit operation but instead perform four parallel operations, the guard corrector 250 can generate four reduced-precision results 255—one for each of the parallel operations (e.g., reduced precision results 255A-255D).

In FIG. 2, the guard monitors 225 are in side-band logic 260. That is, the guard monitors 225 can be considered as side-band operations that execute in parallel with the arithmetic units 205 forming the chain 201. In some embodiment, the guard monitors 225 may be considered as forming a secondary chain which executes in parallel with the chain 201. Further, the guard corrector 250 may be part of the side-band logic 260.

In one embodiment, the side-band logic 260 includes programmable logic and/or a programmable network. That is, the guard monitors 225, as well as the guard corrector 250, can be formed from programmable logic (e.g., configurable logic blocks) rather than hardened circuitry—i.e., non-programmable circuitry. In this example, the IC 200 may be an FPGA or other programmable logic device. While the arithmetic units 205 can also be formed from programmable circuitry, in other embodiments, the arithmetic units 205 are hardened circuitry. For example, the FPGA may include both hardened and programmable circuitry. The arithmetic units 205 may be formed using hardened circuitry (which may improve their performance) while the guard monitors 225 are formed using programmable logic in the side-band logic 260. Although the guard monitors 225 are in programmable logic, which may be slower than using customized, hardened circuitry, the techniques described herein can operate the guard monitors 225 at sufficient speeds so that the side-band logic 260 does not slow down or pause the chain 201. However, in another embodiment, both the arithmetic units 205 and the guard monitors 225 may both be implemented using programmable logic or may both be implemented using hardened circuitry (in which case the IC 200 may be a non-programmable IC such as an ASIC).

In one embodiment, the number of guard monitors 225 and arithmetic units 205 may be the same (or there may be one less guard monitor 225 than the arithmetic unit 205). In another embodiment, there may be at least as twice as many arithmetic units 205 as guard monitors 225.

Figure 3:
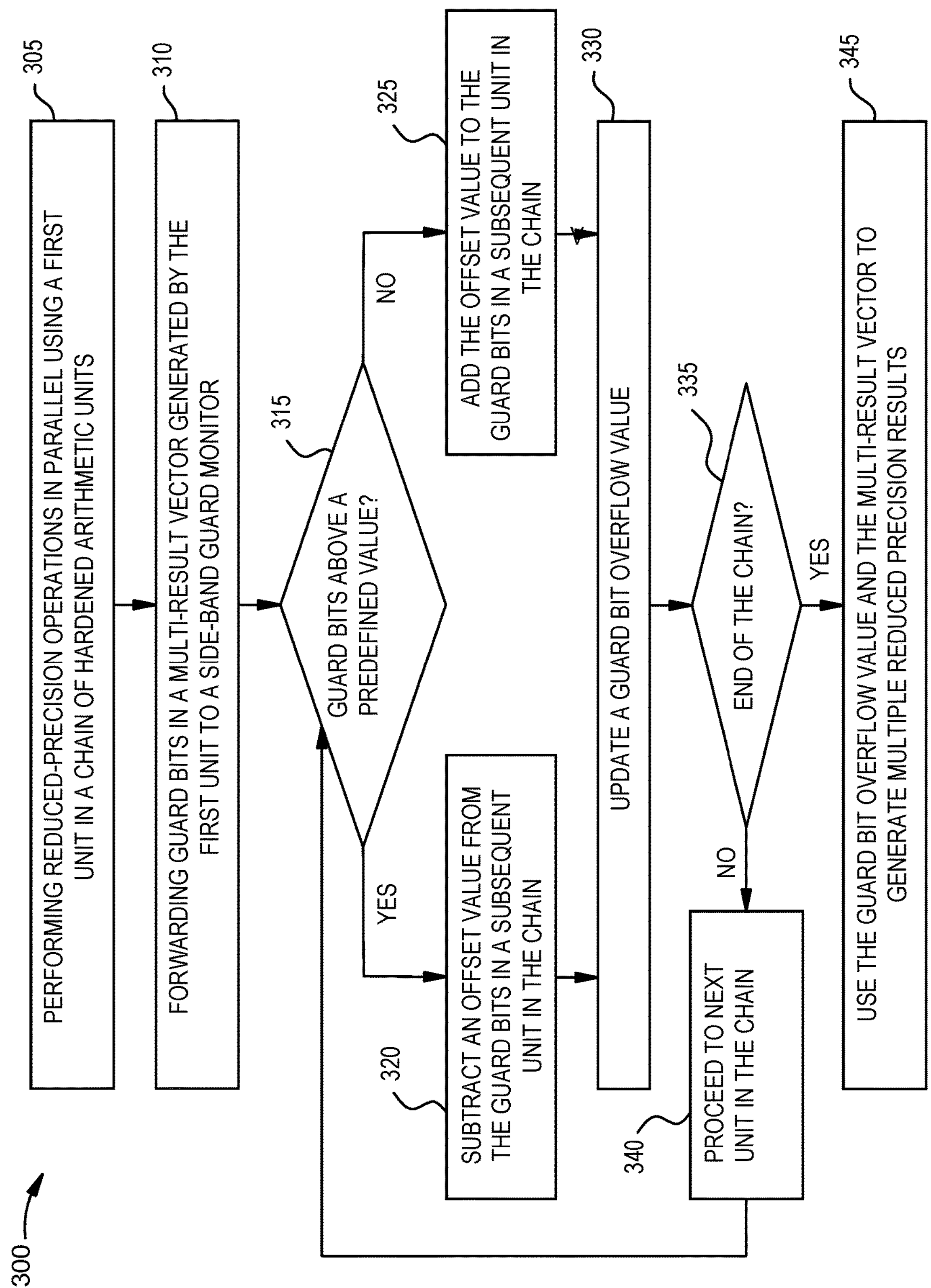
FIG. 3 is a flowchart for performing parallel reduced-precision arithmetic operations, according to an example.

FIG. 3 is a flowchart of a method 300 for performing parallel reduced-precision arithmetic operations, according to an example. At block 305, a first arithmetic unit in a chain of hardened arithmetic units performs reduced-precision operations in parallel. That is, the first arithmetic unit is configured to perform a large integer operation but instead virtual vectorization is used to perform reduced-precision integer operations in parallel using the wide integer data path for performing the large integer operation. For example, instead of performing a 16 bit operation (e.g., the large integer operation), the first arithmetic unit performs two parallel 8 bit operations or four parallel 4 bit operations using the wide data path that was designed to perform the 16 bit operation.

At block 310, the first arithmetic unit forwards guard bits in a multi-result vector generated by the first unit to a side-band guard monitor. Referring back to FIG. 2, the arithmetic unit 205A includes a data path to the guard monitor 225A which enables the unit 205A to forward the guard bits 220A to the monitor 225A. Moreover, depending on whether the first arithmetic unit is performing two, four, or eight parallel operations, the first arithmetic unit may transmit multiple groups or sets of guard bits to the guard monitor.

At block 315, the comparator in the guard monitor 225 determines whether the guard bits (or each set or group of guard bits) are above a predefined value. If the value of the guard bits is above the predefined value, the method 300 proceeds to block 320 where the guard monitor subtracts an offset value from the guard bits in a subsequent arithmetic unit in the chain. Conversely, if the value of the guard bits is below the predefined value, the method 300 proceeds to block 325 where the guard monitor adds the offset value to the guard bits in a subsequent arithmetic unit in the chain. In this manner, the guard monitor can use blocks 320 and 325 to adjust the guard bits to the predefined value to prevent an overflow.

FIG. 4 is a chart 400 that illustrates monitoring the guard bits to prevent an overflow, according to an example. The first column in the chart 400 illustrates the various guard bit values of the guard bits received by the guard monitor. In this example, the guard bits form a 4-bit guard band which ranges from a value of 0 to 15. The second column of the chart 400 illustrates the offset value that is either added to the guard bits (if the guard bits value is less than the predefined value which is some number between 7 and 8) or subtracted from the guard bits (if the guard bits value is greater than the predefined value). In this example, if the guard bit value is 7 or below, two is added to the guard bit value but if the guard bit value is 8 or above, two is subtracted from the guard bit value. As a result, each time the guard bits are evaluated by the guard monitor, the guard monitor changes the guard bit value towards the predefined value. Doing so prevents the guard bits from overflowing (either a negative overflow by falling below the 0 guard bit value or a positive overflow by exceeding the 15 guard bit value). That is, the reduce-precision operation performed by the arithmetic unit may cause either a negative or positive overflow. However, the guard monitors adjust the guard bits so that they move towards the predefined value which avoids an overflow.

The third column in the chart 400 illustrates the range of the new guard bit value after adding or subtracting the offset value. Because the effect on the guard bits is not known when the next operation is performed in the chain (which is due to pipelining the sideband computation for performance reasons), the new guard bit value is also not known, but its range can be guaranteed. That is, as illustrated in the method 300, the offset value is added or subtracted in a subsequent arithmetic unit (which can be the next arithmetic unit in the chain or a unit further down the chain) which means the operation performed by the subsequent arithmetic unit can also affect the new value of the guard bits. Nonetheless, the offset value can be set to ensure the guard bits do not overflow regardless whether the offset value is done in the next arithmetic unit in the chain or in a unit that is further down the chain.

The chart 400 (and the blocks 320 and 325 in the method 300) illustrates always changing the guard bits either by adding or subtracting the offset value whenever the guard bits are forwarded to a guard monitor. Doing so simplifies the logic in the guard monitors which means these hardware elements, which can be implemented using programmable logic, can perform fast enough to keep up with arithmetic units implemented using hardened logic. However, in other embodiments, the guard monitors may not change the guard bits if they are within a certain range. For example, the guard monitor may add two to the guard bits if their value is between 0-3, subtract two from the guard bits if their value is between 12-15, but otherwise, the guard monitors do not change the guard bits. In other embodiments, the method 300 can use any number of thresholds when changing the guard bits.

Returning to the method 300, after determining whether to add or subtract the offset value, at block 330, the guard monitor updates a guard bits overflow value (e.g., the overflow value 240A illustrated in FIG. 2) to account for adjusting the guard bits using the offset value. For example, in addition to transmitting the offset value to the subsequent arithmetic unit, the guard monitor also transmits the offset value to a subsequent guard monitor that corresponds to the arithmetic unit. If that guard monitor determines that the subsequent arithmetic unit added the offset value to the guard bits, then the guard monitor subtracts the offset value from the guard bits overflow value. Conversely, if the guard monitor determines the subsequent arithmetic unit subtracted the offset value, then the guard monitor adds the offset value from the guard bits overflow value.

At block 335, if the end of the chain has not been reached, at block 340 the method 300 proceeds to the next arithmetic unit in the chain which generates a new multi-result vector using its own operands and the multi-result vector received from the first arithmetic unit. The method 300 then returns to block 315 to determine whether the guard bits for the new multi-result vector are above the predefined value. In one embodiment, the guard bits may be compared by a guard monitor during each step in the chain (e.g., each time an arithmetic unit generates a new multi-result vector). However, in other examples, blocks 315, 320, 325, and 330 may be performed every other step in the chain (or every third step, fourth step, fifth step, etc. in the chain).

Once the end of the chain is reached, the method proceeds to block 345 where the guard corrector uses the guard bits overflow value from the last guard monitor in the side-band logic and the multi-result vector generated by the last arithmetic unit in the chain to generate the multiple reduced precision results. Using the vector 100A in FIG. 1 as an example of a the final result vector, bits 18-48 of the vector 100A contain the reduced-precision results of the first parallel operation while the bits 0-14 contain the least significant bits for the second parallel operation. Because the guard bits 110 (i.e., bits 15-17 in this example) may have been adjusted to avoid an overflow, they do not accurately represent the most significant bits of the second parallel operation. Instead, the overflow value can be used to correct the guard bits to then identify the most significant bits of the second parallel operation which can be combined with the least significant bits 115. In this manner, the adjustments made to the guard bits when executing the chain can be corrected using the overflow value which propagates through the chain of guard monitors in the side-band logic.

Figure 5:
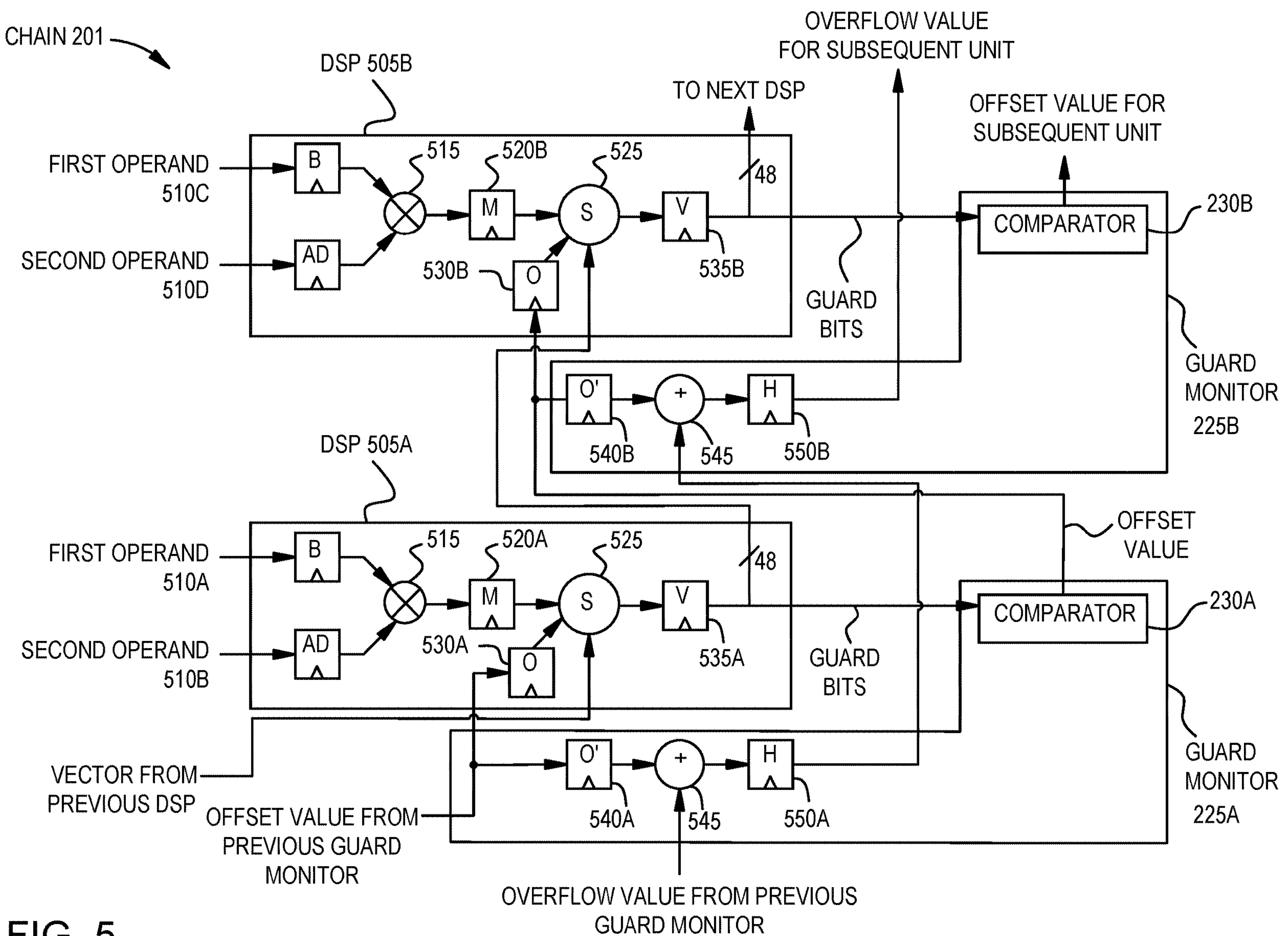
FIG. 5 illustrates a system that monitors the guard bits to prevent an overflow, according to an example.

FIG. 5 illustrates a chain 201 that monitors the guard bits to prevent an overflow, according to an example. The chain 201 includes DSPs 505 (which are one type of arithmetic unit) which perform a multiply and accumulate operation (e.g., a MAC). Specifically, the DSP 505A multiples a first operand 510A with a second operand 510B by the multiply operation 515 the result of which is stored in the register 520A. Similarly, the DSP 505B multiples a first operand 510C with a second operand 510D by the multiply operation 515 the result of which is stored in the register 520B. The operands 510 can include multiple sub-operands which can use the DSPs 505 to perform parallel reduced-precision operations using the multiply operation 515.

The result of the multiply operation is stored in the register 520A and then sent to an accumulate operation 525 where the result is accumulated to a multi-result vector received from a previous DSP (not shown) in the chain 201 as well as a offset value stored in the register 530A. The offset value is received from a previous guard monitor (not shown). In addition to using the offset value as an input to the accumulate operation 525, the inverse of the offset value is stored in a register 540A in the guard monitor 225A. The inverse offset value is then combined with the overflow value received from the previous guard monitor using the operation 545. Because the offset value in the register 540A is the inverse of the offset value stored in the register 530A, if the offset value is subtracted from the guard bits during the accumulate operation 525, the offset value is added to the overflow value from the previous guard monitor by the operation 545 in the guard monitor 225A, thereby compensating for the change in the guard bits (which maps to block 330 of the method 300). The result of performing the operation 545 is a new guard bits overflow value which is stored in a register 550A in the guard monitor 225A.

The result of the accumulate operation 525 is a new multi-result vector which is stored in a register 535A. The value of this register (e.g., 48 bits) is then transmitted to the next DSP in the chain 201—i.e., the DSP 505B. The guard bits (e.g., bits 14-17) are transmitted to the comparator 230A in the guard monitor 225A. As discussed at block 315, 320, and 325 of the method 300, the comparator 230A can compare the guard bits to a predefined value and determine whether to add or subtract the offset value. The guard monitor 225A transmits the updated overflow value stored in the register 550A and the offset value generated by the comparator 230A to the guard monitor 225B. Although FIG. 5 illustrates transmitting these values to the next guard monitor 225B and DSP 505B in the chain 201, these values can be forwarded to a later step in the chain 201, so long as the offset value (and the number of steps) is not so large that the guard bits could overflow before the offset value is added or subtracted from the multi-result vector in the subsequent DSP.

The DSP 505B receives the multi-result vector generated by the DSP 505A and the overflow value and the offset value generated by the guard monitor 225A. The accumulate operation 525 combines the offset value and the previous multi-result vector with the results of the multiply operation stored in a register 520B. The new multi-result vector is stored in a register 535B and can be forwarded to the next DSP in the chain 201 while the guard bits are transmitted to the comparator 230B for determining a new offset value.

Meanwhile, the guard monitor 225B stores the inverse of the offset value received from the guard monitor 225A in a register 540B. The operation 545 then combines the inverse offset value with the overflow value received from the guard monitor 225A to generate a new offset value which compensates for adjusting the guard bits during the accumulate operation 525 in the DSP 505B. The new overflow value is then stored in a register 550B and can be passed to a subsequent guard monitor in the chain 201. In this manner, the guard bits in the multi-result vector can be adjusted as the operations proceed through the chain using the guard monitors 225 that store an overflow value which compensate or track the changes made to the guard bits. In one embodiment, the chain 201 can have any number of stages (e.g., any number of linked DSPs 505) and the stages can work without being delayed or paused. That is, the operations performed by the guard monitors 225 in the side-band logic (which can be implemented using programmable logic) can occur in parallel with the operations performed in the DSPs 505 (which can be implemented using hardened circuitry).

Figure 6:
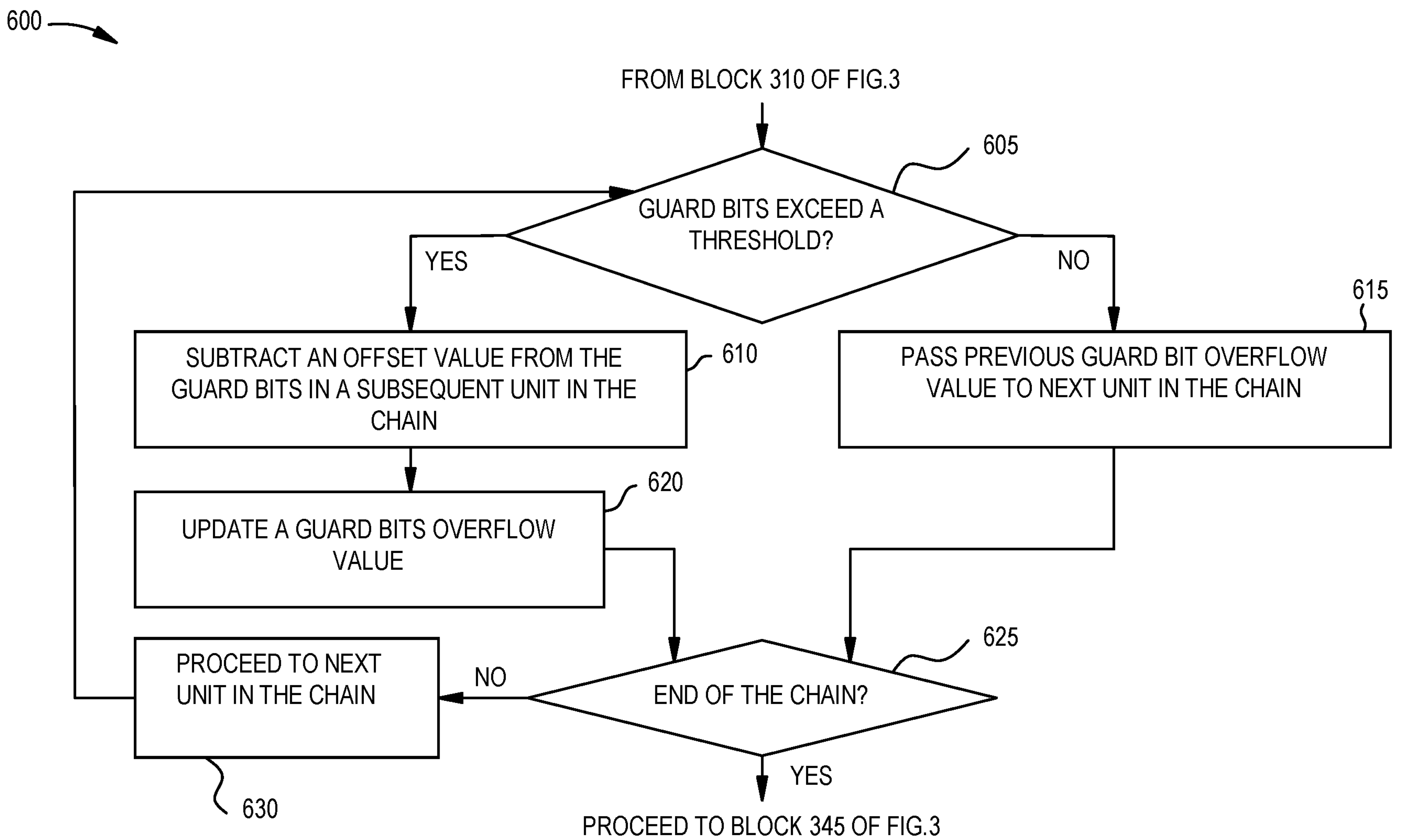
FIG. 6 is a flowchart for performing parallel reduced-precision arithmetic operations, according to an example.

FIG. 6 is a flowchart of a method 600 for performing parallel reduced-precision arithmetic operations, according to an example. The method 600 begins after block 310 of FIG. 3. At block 605, the guard monitor determines whether the guard bits received from the first arithmetic unit exceed a threshold. In this embodiment, rather than the guard bits being used to represent signed integers, the guard bits may be part of an unsigned integer. Handling unsigned guard bits is illustrated in FIG. 7.

FIG. 7 is a chart 700 that illustrates monitoring the guard bits to prevent an overflow, according to an example. The first column in the chart 700 illustrates the various guard bit values of the guard bits received by the guard monitor. In this example, the guard bits form an unsigned 2-bit guard band which ranges from a value of 0 to 3. For guard bit values that are less than 2, the guard monitor does not add an offset value—e.g., the offset value is zero. However, if the guard bit value is 2 or 3, the guard monitor selects a −1 as the offset value. That is, when adding the offset value in a subsequent stage or arithmetic unit in the chain, the guard bit value is reduced. The third column of the chart illustrates the range of the new guard bit value after adding the offset value. Because the effect on the guard bits is not known when the next operation is performed in the subsequent arithmetic unit in the chain, the new guard bit value is also not known, but its range can be guaranteed as shown by the chart 700. In this manner, the guard monitor can select the offset value to ensure the guard bits do not overflow regardless whether the offset value is done in the next arithmetic unit in the chain or in a unit that is further down the chain.

Returning to the method 600, if the guard bits exceed the threshold, the method 600 proceeds to block 610 where a subsequent arithmetic unit in the chain subtracts an offset value (or adds a negative offset value) from the guard bits. Using the chart 700 as an example, if the guard bit value is above 1 (e.g., a 2 or 3), the guard monitors transmits a negative one offset value to a subsequent arithmetic unit. At block 620, a downstream guard monitor corresponding to the subsequent arithmetic unit updates a guard bits overflow value to compensate for subtracting the offset value at block 610.

However, if the guard bits do not exceed the threshold, the method 600 proceeds to block 615 where the guard monitor passes the previous guard bits overflow value to the next unit in the chain. That is, if the guard bits are not changed at the subsequent stage, the guard monitor associate with that stage does not change the overflow value. Stated differently, block 620 is not performed when the unsigned guard bits are below the threshold.

At block 625, if the end of the chain has not been reached, at block 630 the method 600 proceeds to the next arithmetic unit in the chain which generates a new multi-result vector using its own operands and the multi-result vector received from the first arithmetic unit. The method 600 then returns to block 605 to determine whether the guard bits for the new multi-result vector are above the threshold. Once the end of the chain is reached, the method 600 proceeds to block 345 of FIG. 3 where the guard corrector determines the results of the reduced-precision operations using the multi-result vector generated at the last arithmetic unit in the chain and the overflow value stored at the last guard monitor.

Figure 8:
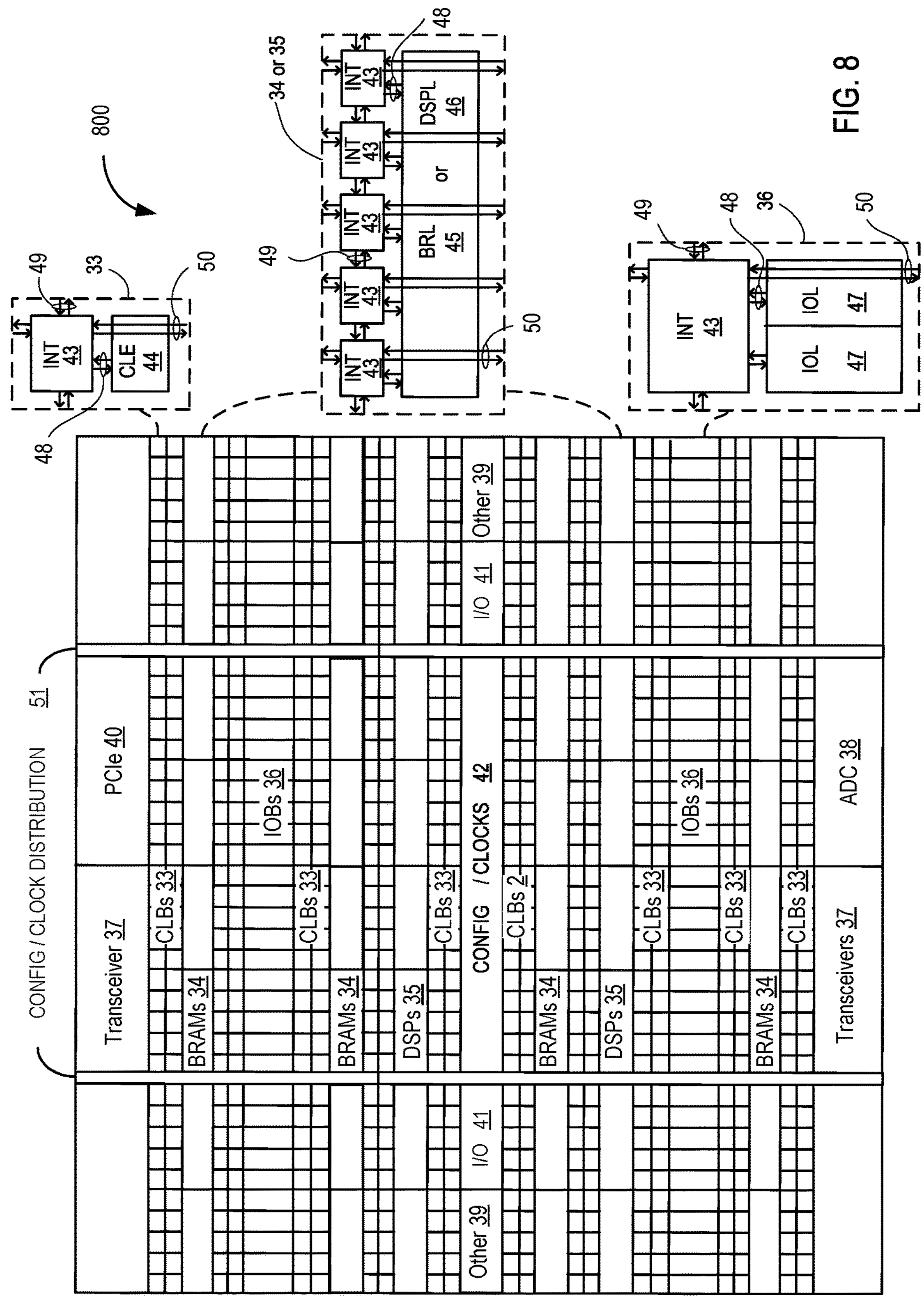
FIG. 8 illustrates a field programmable gate array implementation of a programmable IC according to an example.

FIG. 8 illustrates an FPGA 800 implementation of the IC 200 that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 8. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. In one embodiment, the guard monitors 225 (and the guard corrector 250) in FIG. 2 are implemented using one or more of the CLBs 33. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 8) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:

a chain of arithmetic units, wherein each arithmetic unit is configured to selectively perform either a single large operation or multiple reduced-precision operations in parallel, wherein the arithmetic units are configured to, when performing the multiple reduced-precision operations in parallel, generate multi-result vectors comprising guard bits;

side-band logic comprising a plurality of guard monitors, wherein each of the plurality of guard monitors is configured to:

receive the guard bits from one of the arithmetic units, generate an offset value based on determining whether the guard bits satisfy a predefined value, transmit the offset value to a subsequent arithmetic unit in the chain, and update a guard bits overflow value to compensate for changing the guard bits in a multi-result vector in the subsequent arithmetic unit using the offset value; and a guard corrector configured to generate multiple reduced-precision results based on receiving a multi-result vector from a last arithmetic unit in the chain and a guard bits overflow value from a last guard monitor of the plurality of guard monitors.

2. The integrated circuit of claim 1, wherein each of the arithmetic units includes an accumulate operation, wherein the offset value is a first input to the accumulate operation.

3. The integrated circuit of claim 2, wherein each of the arithmetic units includes a multiply operation for multiplying operands, wherein a result of the multiply operation is a second input to the accumulate operation.

4. The integrated circuit of claim 3, wherein the accumulate operation is configured to receive a forwarded multi-result vector from a previous arithmetic unit in the chain, wherein the forwarded multi-result vector is a third input to the accumulate operation, wherein an output of the accumulate operation is a multi-result vector for a current stage in the chain.

5. The integrated circuit of claim 1, wherein the arithmetic units are digital signal processor (DSP).

6. The integrated circuit of claim 1, wherein the guard bits separate, in the multi-result vectors, a first portion of the multi-result vectors storing least significant bits of a first operation of the reduced-precision operations and a second portion of the multi-result vectors storing a result of a second operation of the reduced-precision operations.

7. The integrated circuit of claim 1, wherein the multi-result vectors include at least two sets of guard bits, wherein the at least two sets of guard bits separate at least three portions of the multi-result vectors assigned to store results for at least three operations of the reduced-precision operations.

8. The integrated circuit of claim 1, wherein the chain of arithmetic units is implemented using hardened circuitry and wherein the plurality of guard monitors in the side-band logic is implemented using programmable logic, wherein the integrated circuit is a field-programmable gate array that includes both the hardened circuitry and the programmable logic.

9. The integrated circuit of claim 1, wherein the integrated circuit is an application specific integrated circuit (ASIC), and wherein the chain of arithmetic units and the side-band logic are implemented using hardened circuitry.

10. A circuit, comprising:

a chain of arithmetic units, wherein each arithmetic unit is configured to perform multiple reduced-precision operations in parallel, wherein the arithmetic units are configured to, when performing the multiple reduced-precision operations in parallel, generate multi-result vectors comprising guard bits;

side-band logic configured to:

receive first guard bits from a first one of the arithmetic units, generate an offset value based on determining whether the first guard bits satisfy a predefined value, transmit the offset value to a subsequent arithmetic unit in the chain, and update a first guard bits overflow value to compensate for changing second guard bits in a multi-result vector in the subsequent arithmetic unit using the offset value; and a guard corrector configured to generate multiple reduced-precision results based on receiving a multi-result vector from a last arithmetic unit in the chain and a second guard bits overflow value based on the first guard bits overflow value.

11. The circuit of claim 10, wherein each of the arithmetic units comprises an accumulate operation, wherein the offset value is a first input to the accumulate operation.

12. The circuit of claim 11, wherein each of the arithmetic units comprises a multiply operation for multiplying operands, wherein a result of the multiply operation is a second input to the accumulate operation.

13. The circuit of claim 12, wherein the accumulate operation is configured to receive a forwarded multi-result vector from a previous arithmetic unit in the chain, wherein the forwarded multi-result vector is a third input to the accumulate operation, wherein an output of the accumulate operation is a multi-result vector for a current stage in the chain.

14. The circuit of claim 10, wherein the guard bits separate, in the multi-result vectors, a first portion storing least significant bits of a first operation of the reduced-precision operations and a second portion storing a result of a second operation of the reduced-precision operations.

15. A method, comprising:

performing multiple reduced-precision operations in parallel using a first arithmetic unit in a chain of arithmetic units to generate a multi-result vector comprising guard bits, wherein the arithmetic units are capable of performing both the multiple reduced-precision operations and a single large operation;

receiving the guard bits from the first arithmetic unit;

generating an offset value based on determining whether the guard bits satisfy a predefined value;

transmitting the offset value to a subsequent arithmetic unit in the chain; and updating a guard bits overflow value to compensate for changing the guard bits in a multi-result vector in the subsequent arithmetic unit using the offset value.

16. The method of claim 15, further comprising:

generating multiple reduced-precision results based on a multi-result vector generated by a last arithmetic unit in the chain and a final guard bits overflow value.

17. The method of claim 15, wherein changing the guard bits in the multi-result vector in the subsequent arithmetic unit further comprises:

performing an accumulate operation in the subsequent arithmetic unit using the offset value as a first input and a forwarded multi-result vector received from a previous arithmetic unit in the chain as a second input.

18. The method of claim 15, wherein the guard bits separate, in the multi-result vector, a first portion storing least significant bits of a first operation of the reduced-precision operations and a second portion storing a result of a second operation of the reduced-precision operations.

19. The method of claim 15, wherein receiving the guard bits from the first arithmetic unit comprises:

receiving the guard bits at side-band logic, wherein the side-band logic is implemented using programmable logic.

20. The method of claim 19, wherein updating the guard bits overflow value comprises:

updating one of a plurality of registers in the side-band logic storing respective guard bits overflow values for corresponding stages in the chain.

* * * * *